United States Patent
Matsumoto et al.

(10) Patent No.: US 7,874,202 B2
(45) Date of Patent: Jan. 25, 2011

(54) PROBE APPARATUS FOR MEASURING AN ELECTRON STATE ON A SAMPLE SURFACE

(75) Inventors: Takuya Matsumoto, Kyoto (JP); Tomoji Kawai, Minoo (JP)

(73) Assignee: Japan Science and Technology Agency, Kawaguchi-shi (JP)

( * ) Notice: Subject to any disclaimer, the term of this patent is extended or adjusted under 35 U.S.C. 154(b) by 222 days.

(21) Appl. No.: 12/346,379

(22) Filed: Dec. 30, 2008

(65) Prior Publication Data

US 2009/0145209 A1 Jun. 11, 2009

Related U.S. Application Data

(63) Continuation of application No. 11/616,241, filed on Dec. 26, 2006, now Pat. No. 7,487,667, which is a continuation of application No. PCT/JP2005/005583, filed on Mar. 25, 2005.

(30) Foreign Application Priority Data

Jun. 25, 2004 (JP) .............................. 2004-188360

(51) Int. Cl.
*G01B 5/28* (2006.01)
(52) U.S. Cl. .................. 73/105; 850/1; 850/6; 850/33; 850/52
(58) Field of Classification Search .................. 73/105; 850/1, 6, 33, 52, 63
See application file for complete search history.

(56) References Cited

U.S. PATENT DOCUMENTS

| | | | |
|---|---|---|---|
| 5,003,815 A | 4/1991 | Martin et al. | |
| 5,319,977 A | 6/1994 | Quate et al. | |
| 5,627,365 A | 5/1997 | Chiba et al. | |
| 5,821,409 A * | 10/1998 | Honma et al. | ................ 73/105 |
| 5,960,147 A | 9/1999 | Muramatsu et al. | |
| 5,986,256 A | 11/1999 | Yagi | |
| 6,046,448 A | 4/2000 | Sato et al. | |
| 6,085,580 A * | 7/2000 | Ludeke et al. | ................ 73/105 |
| 6,104,030 A | 8/2000 | Chiba et al. | |
| 6,583,412 B2 | 6/2003 | Williams | |
| 6,834,537 B1 | 12/2004 | Niwa et al. | |
| 7,250,602 B2 * | 7/2007 | Matsumoto et al. | ......... 250/310 |
| 2003/0015651 A1 | 1/2003 | Kiguchi et al. | |
| 2003/0197120 A1 | 10/2003 | Miyamoto | |

FOREIGN PATENT DOCUMENTS

| | | |
|---|---|---|
| JP | 7-260808 | 10/1995 |
| JP | 10-260190 | 9/1998 |
| JP | 2000-81382 | 3/2000 |
| JP | 2002-245810 | 8/2002 |

OTHER PUBLICATIONS

Martin Y. et al., "Atomic force microscope-force mapping and profiling on a sub 100-A scale," J. Appl. Phys 61(10), May 15, 1987, 4723-4729.

* cited by examiner

*Primary Examiner*—Daniel S Larkin
(74) *Attorney, Agent, or Firm*—Oblon, Spivak, McClelland, Maier & Neustadt, L.L.P.

(57) ABSTRACT

In a probe apparatus that intermittently irradiates a sample with excitation light to observe the sample while subjecting a cantilever including a probe arranged to face a surface of the sample to self-excited vibration at a predetermined frequency, the sample is irradiated with the excitation light at a predetermined timing when a distance between the probe and the sample is not greater than a predetermined distance.

7 Claims, 3 Drawing Sheets

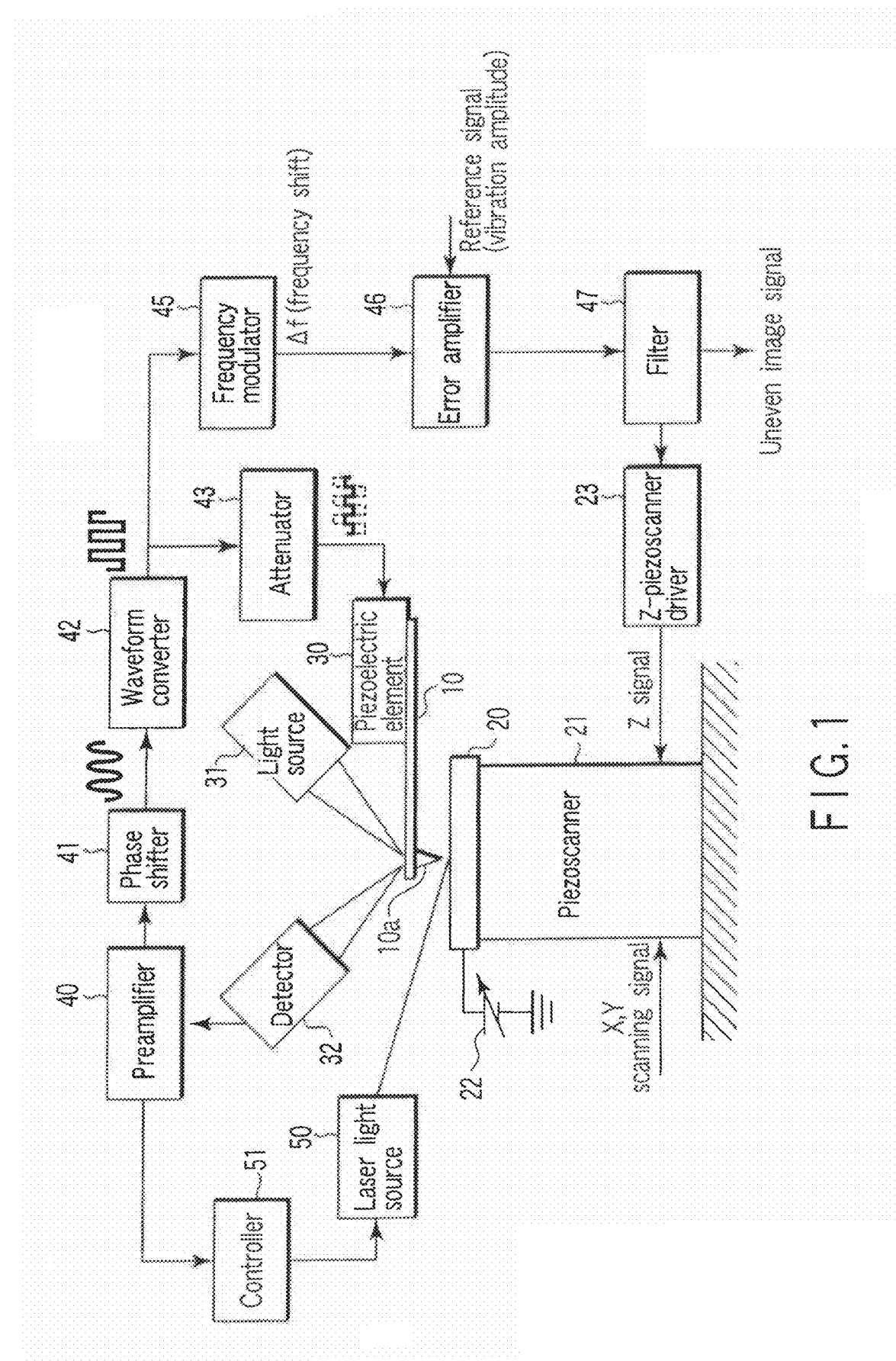
F I G. 1

PROBE APPARATUS FOR MEASURING AN ELECTRON STATE ON A SAMPLE SURFACE

CROSS REFERENCE TO RELATED APPLICATIONS

This is a continuation application of Ser. No. 11/616,241, filed Dec. 26, 2006, now U.S. Pat. No. 7,487,667, which is incorporated herein by reference and which is a continuation application of PCT Application No. PCT/JP2005/005583, filed Mar. 25, 2005, which was published under PCT Article 21(2) in Japanese.

This application is based upon and claims the benefit of priority from prior Japanese Patent Application No. 2004-188360, filed Jun. 25, 2004, the entire contents of which are incorporated herein by reference.

BACKGROUND OF THE INVENTION

1. Field of the Invention

The present invention relates to a probe apparatus including such as an atomic force microscope (AFM) and a scanning tunneling microscope (STM).

2. Description of the Related Art

In recent years, a non-contact type atomic force microscope has rapidly advanced. This microscope vibrates a cantilever serving as a probe with self-excitation to detect a small shift of the resonance frequency caused due to a charge-transfer force between the cantilever and a sample, thereby enabling nanoscopic measurement of a surface electron state (see, e.g., U.S. Pat. No. 7,250,602). Since this microscope detects a frequency, the microscope has resistance to noise and can detect an fN (femto-Newton) level force since a frequency is detected. Therefore, a single atom as well as a small charged state that is not greater than a single charge can be readily detected.

However, observation of an image with respect to a photoexcited electron transfer process is required by measuring a change in an electron state in a short time (e.g., nanoseconds) in addition to nanoscopic measurement of a surface electron state. Here, detecting a fast signal is attempted in the STM. But, since local charges diffuse to a conductor substrate, a time resolution of the STM cannot be exploited. Further, in the AFM, a single charge on an insulator can be detected by an electrostatic force. But, a scanning time is longer than 10 seconds, and it is approximately 0.1 second even in a special high-speed AFM. Therefore, a dynamic process cannot be tracked.

In nature, a subtle stereoscopic nano-structure is configured, and it has been revealed that a nanoscopic spatial arrangement is decisively important in highly efficient photoexcited electron transfer that can be observed in photosynthesis. However, when analyzing these structures in a conventional technology, there is only an indirect method, such as comparing a kinetic study on a solution-based molecular population with a crystal structure analysis using an X-ray or radiation light.

BRIEF SUMMARY OF THE INVENTION

An object of the present invention is to provide a probe apparatus that can observe a change in an electron state (electron transfer) of a molecule (or an atom) excited by light irradiation with a high time resolution and a high spatial resolution. It is to be noted that realizing the following matters can be expected in the probe apparatus according to the present invention.

1) A relationship between an intermolecular distance or a molecular orientation and a charge-transfer rate is directly revealed from an image by observing an image of a photoexcited charge transfer process between donor and acceptor molecules.

2) Long-distance electron transfer between oxidizing and reducing sites through a protein in, e.g., photosynthesis are experimentally examined a relationship between a conformation of a protein molecule and inter-site electronic coupling.

MEANS FOR ACHIEVING THE OBJECT

The invention pays attention synchronous process of the mechanical motion and the electronic process, and is characterized in that, in a probe apparatus that intermittently irradiates a sample with excitation light to observe the sample while subjecting a cantilever including a probe arranged to face a surface of the sample to self-excited vibration, the sample is irradiated with the excitation light at a predetermined timing when a distance between the probe and the sample is not greater than a predetermined distance.

BRIEF DESCRIPTION OF THE SEVERAL VIEWS OF THE DRAWING

FIG. 1 is a view showing a schematic configuration of a probe apparatus according to the present invention;

DETAILED DESCRIPTION OF THE INVENTION

Figure 2:
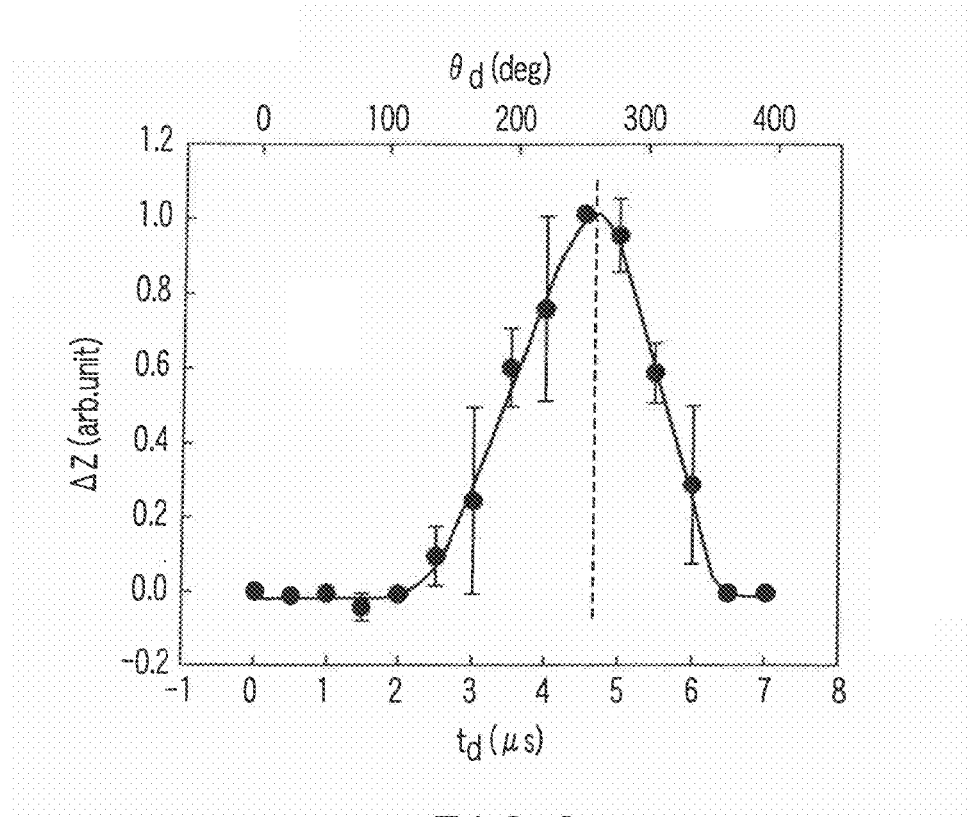
FIG. 2 is a graph showing a relationship between a delay time of laser irradiation and a force applied to a cantilever (displacement of a frequency is actually measured) when a distance between the cantilever and a sample surface is closest.

An embodiment according to the present invention will now be explained with reference to the accompanying drawings.

In a non-contact atomic force microscope, an electron state on a sample surface can be measured as described above by measuring a displacement of a resonance frequency of a cantilever caused by weak force acting on a probe enables. Therefore, when the sample surface is scanned by using the probe, this resonance frequency always fluctuates. Under such conditions, it is apparent that a timing of light irradiation cannot be synchronized with a vibration (a motion) of the cantilever when a sample is irradiated with a photoexcitation laser beam at a predetermined repetition frequency. Thus, it is necessary to detect a stroke for each reciprocation concerning a vibration of the cantilever or a time concerning a single reciprocation (i.e., a period of the vibration) and configure a system that emits a photoexcitation laser beam in accordance with the detection. FIG. 1 is a view showing a schematic configuration of a probe apparatus according to the present invention.

As a probe apparatus, a conductive cantilever 10 having a probe 10a is used. It is to be noted that, as shown in FIG. 1, a sample 20 is arranged at a position facing the probe 10a on a piezoscanner 21 to be movable in triaxial directions. Further, a bias 22 having a variable applied voltage can apply a desired voltage to the sample 20. It is to be noted that an embodiment of applying a bias to the sample will be explained in this specification, but the bias may be applied to the probe.

The piezoscanner 21 is movable along an X-Y plane with an X-Y scanning signal, whereby a surface state at a desired position can be measured. As a result, the surface state can be observed while scanning the sample 20. Furthermore, the piezoscanner 21 is movable in a Z-direction by receiving a Z-signal from a Z-piezoscanner driver 23 which will be explained later in detail, and a distance between the sample 20 and the probe 10*a* is maintained constant by the Z-signal.

A specific operation will be described with reference to FIG. 1.

For example, the cantilever 10 that has received an energy by, e.g., noise starts vibration. A motion of this cantilever 10 is detected by an optical system including a light source 31 and a detector 32 formed of a four-divided photodiode (this optical system will be referred to as an "optical lever"), converted into an electric signal, and output to a preamplifier 40. A periodic signal output from the preamplifier 40 is output to a transfer unit 41 and a controller 51. A synchronization signal output to the phase shifter 41 is compensated in regard to delay in an electric measurement system. A signal output from the phase shifter 41 is converted into a rectangular wave signal in a waveform converter 42. The rectangular wave signal output from the waveform converter 42 is input to an attenuator 43 and a frequency demodulator 45.

The attenuator 43 attenuates the input rectangular wave signal at a predetermined rate. The rectangular wave signal subjected to this attenuation is input to a piezoelectric element 30 of the cantilever 10, and the cantilever 10 controls to automatically continue vibration with a vibration amplitude. As a result, the cantilever 10 performs self-excited vibration.

A signal concerning a vibration amplitude value of the cantilever 10 is output by the rectangular wave signal input to the frequency demodulator 45, and a difference from a reference signal is calculated in an error amplifier 46. An output signal from the error amplifier 46 is output to a non-illustrated display section (an output section) through a filter 47 as an uneven image signal. A signal from the filter 47 is also output to the Z-piezoscanner driver 23 to control a movement of the sample 20 in the Z-direction.

Further, by changing an applied voltage from the bias 22 to control a potential difference between the probe 10*a* and the sample 20, a frequency shift in a local state with each set voltage is detected.

The controller 51 controls an emission timing of irradiation light for excitation from a laser light source 50 based on a periodic signal output from the preamplifier 40 to the controller 51. A specific control method is as explained below.

An output from the detector 32 constituting the optical lever is monitored to track a motion of the cantilever. An emission timing of a pulsed laser beam for excitation (which will be simply referred to as a "laser beam" hereinafter) is determined by using this output. The determining method of emission timing will now be described with reference to FIG. 2. FIG. 2 is a graph showing a relationship between a delay time of laser irradiation and a force applied to a cantilever (displacement of a frequency is actually measured) when a distance between the cantilever and a sample surface is closest. In FIG. 2, an abscissa axis represents a delay time from the closest position of the cantilever with respect to the sample surface to irradiation of a laser beam, and an ordinate axis represents displacement of a feedback. It is to be noted that the sample is a membrane of phthalocyanine formed on a silicon substrate.

Measurement shown in FIG. 2 is carried out in a state where the cantilever is fixed at a certain position on the sample surface, but a resonance frequency of the cantilever always varies by scanning when a time-resolved image is obtained while scanning the sample. Therefore, when excitation light enters the optical lever of the probe apparatus, apparent frequency modulation is given thereto. Accordingly, ingress of the laser beam into the optical lever control system must be reduced as much as possible, and hence the following methods are considered.

A first method is a method that excitation light is introduced to the sample surface at a very shallow angle of 1 to 2 degrees vertical to a laser beam in the optical lever system. With this configuration, stray light entering the four-divided photodiode as a detector of the optical lever system is scattered light alone from a narrow cantilever distal end. This method has a drawback that a sufficient intensity of excitation light is hardly obtained since the incidence angle is shallow.

A second method is a method of vertically introducing light with respect to a sample using a transparent substrate from a back side of the substrate. When this method is used, the sample can be irradiated with excitation light having a sufficient intensity while avoiding an interference with the optical lever system. However, a drawback is that a study target is restricted to a sample using a transparent substrate, e.g., sapphire.

Since the two light irradiation methods respectively have advantages/drawbacks, a sample stage that can realize both the methods is required. The first method of applying excitation light from a shallow angle requires an optical system that can precisely control an optical path. The second method of performing irradiation from the back side of the sample must adopt a cylindrical piezoelectric element having a hole formed at the center thereof to assure an optical path. A stage of the AFM satisfying these conditions must be newly designed.

Figure 3:
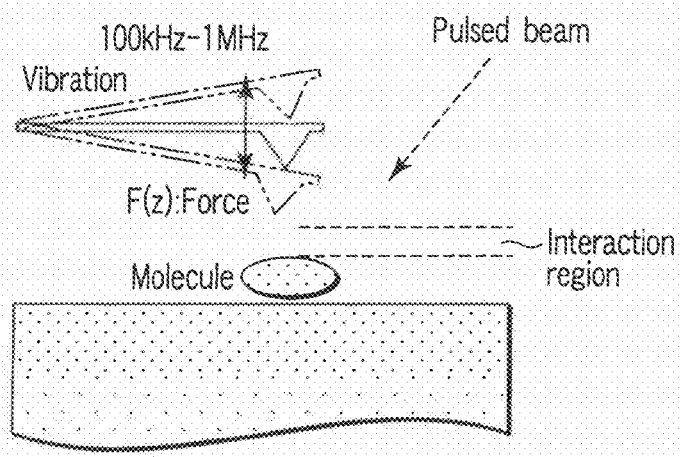
FIG. 3 is a view explaining that an electrostatic force is detected when a position of the cantilever is synchronized with irradiation of a photoexcitation laser beam.

Thus, as shown in FIG. 2, a trigger is generated when the probe is at a predetermined position, this trigger is determined as a reference, and a laser beam is irradiated after a given delay time (i.e., the substantially closest position of the probe to the sample, and it is after approximately 4.7 microseconds in the example shown in FIG. 2). To irradiate the laser beam before the cantilever becomes closest position to the sample surface, a vibration period of a previous period of the cantilever (probe) is measured and a timing may be set with this period determined as a reference. It can be understood from the graph of FIG. 2 that an electrostatic force is detected when a position of the cantilever is synchronized with irradiation of the photoexcitation laser beam. This principle will now be described with reference to FIG. 3. As shown in FIG. 2, a vibration period of the cantilever is a microsecond order. However, a force caused by an interaction (i.e., a shift of a frequency) is detected only at the moment that the cantilever distal end is closed to the surface, and its duration of effective action is as short as approximately 10 ns. Thus, by synchronizing the moment that the cantilever is placed at the closest position to the sample with the pulse laser beam irradiation, both a time resolution of several-ten ns and an atomic level (i.e., nanometer order) spatial resolution is satisfied, and a transitional charge generated by light excitation can be measured. It is to be noted that the time resolution is approximately microseconds in this measurement because measurement is carried out with respect to a sample in which charges are generated on an entire thin film surface thereof. According to this configuration, since the pulse laser beam used for photoexcitation is completely synchronized with a motion of the cantilever, even if excitation light enters the optical lever system, since only amplitude thereof is changed without varying a frequency, a feedback of the atomic force microscope is not affected.

Using the above-described probe apparatus can realize the following applications.

1) Imaging of Aging of a Surface State

For example, it is known that an excitation triplet of 5, 10, 15, 20-tetra-p-N-methylpyridylporphinatozinc (ZnTMPyP) has a long life duration that reaches 1 ms even in an aqueous solution. Furthermore, benzoquinone (BQ) has an excellent capacity as an electron acceptor. Thus, BQ is dispersed and immobilized on a sapphire substrate surface, and a fine particle aggregate of ZnTMPyP is produced thereon by vapor deposition. In such a sample, a charged state obtained by photoexcitation is alleviated with time, and an electron is re-coupled with a hole.

Controlling the dispersed state of BQ and a size of the ZnTMPyP aggregate can adjust electron transfer and a relaxation speed, and hence this system is optimum to effect imaging concerning aging of a surface state. Therefore, this system can be used to generate samples having various conditions, and a relationship between a topograph and photoexcited electron transfer can be directly revealed from an image.

2) Imaging of Charge Transfer in Antenna Type Giant Molecules

In the antenna type giant molecules, since many molecules are cooperatively excited and energy transfer occurs toward a specific region, highly efficient electron transfer, a long-life charge separation state, and multiphoton excitation are achieved. Such an antenna effect is similar to an arrangement of a heme structure in a protein included in a photosynthesis bacteria, and hence it is very interesting. The probe apparatus according to the embodiment of the present invention can image electron transfer dynamics of a molecule having a flat antenna function.

Figure 4:
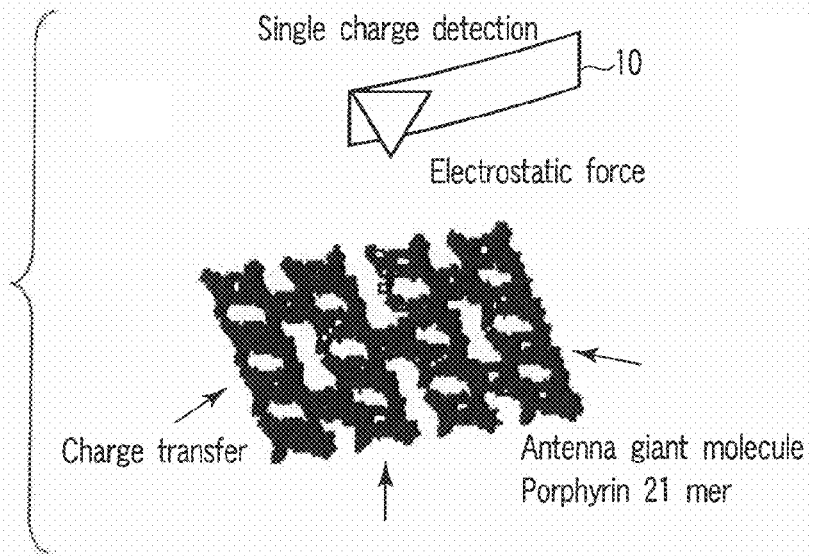
FIG. 4 is a view showing an example of imaging charge transfer in an antenna type giant molecule.

For example, such porphyrin 21mer as shown in FIG. 4 will be considered. Here, when a porphyrin ring having no metal is arranged at the center and a porphyrin ring with a long excitation life such as zinc is arranged at the periphery thereof, charge transfer occurs with a very high efficiency after light irradiation, and a charge separation state is realized between the center and the periphery.

Moreover, when an acceptor portion is arranged at the center of a porphyrin array having a one-dimensional array, it is expected that charge transfer that is dependent on polarization of excitation light can be observed.

3) Charge Separation of Diode Type Porphyrin Under Electric Field Gradient

A diode type molecule having a donor and an acceptor coupled with each other is an idea as a molecule rectifier proposed more than a quarter of a century ago, and it is a central concept of molecular-scale electronics. In the embodiment according to the present invention, a dipole type porphyrin molecule is placed in an intensive electric field gradient to enable direct measurement of a velocity of photoexcited electron transfer. Based on a Marcus theory, a velocity of electron transfer between a donor and an acceptor is subject to a re-orientational energy of a solvent molecule in a liquid solution. However, in a solid surface absorption state where no solvent molecule is present and transfer of a molecule is considerably restricted, how a distance or a difference in ionization potential between the donor and the acceptor affects a tunneling velocity is unknown. Since a molecule has many degrees of internal freedom and an electron state is discrete, fundamental measurement, e.g., confirming whether a simple theory like electron tunneling between metals can be applied can be directly performed.

4) Photoexcited Electron Transfer from Hemoprotein, e.g., Cytochrome C

It is known that a protein, e.g., cytochrome c or azurin highly efficiently performs electron transport. Such a protein has an oxidizable/reducible metal-porphyrin skeleton at the center, and its periphery is covered with an insulative organic molecular layer. Considering this structure from an electronic viewpoint, this protein is positioned as an electronic component having a small capacity partitioned by double tunnel coupling, i.e., a nanosize indicative of a coulomb blockade. In a liquid solution, a photoexcited electron transfer velocity from porphyrin in the protein to an Ru complex coupled with the protein is systematically studied by a spectroscopic method. However, when the protein is fixed on a surface as a solid device, since a structure of the protein is distorted and a conformation change is also suppressed, whether it shows such electronic properties or not cannot be readily presumed.

Figure 5:
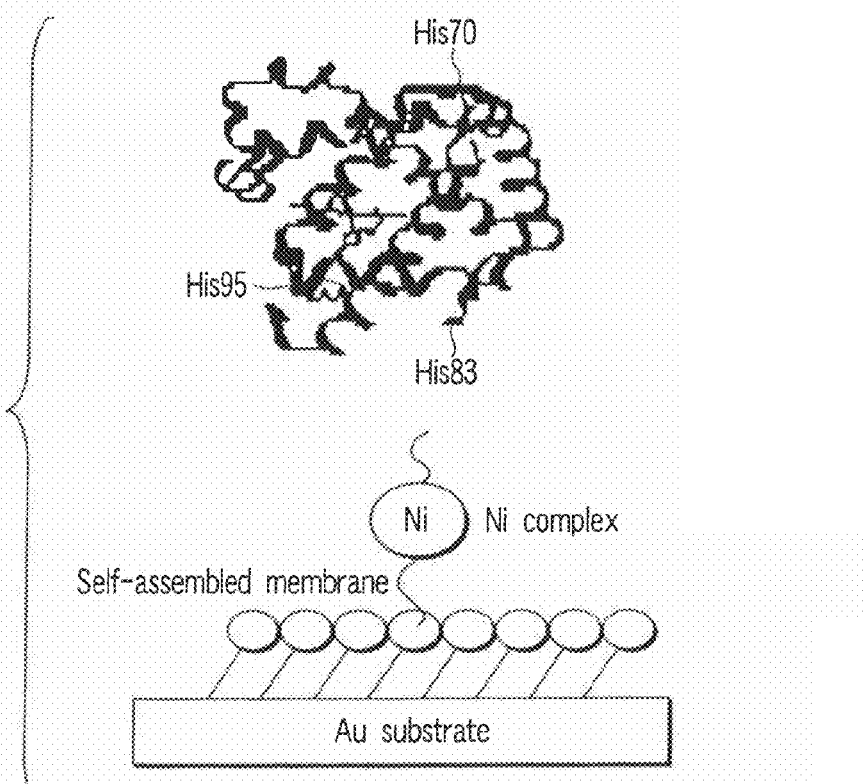
FIG. 5 is a view explaining photoexcited electron transfer from a hemoprotein.

However, histidine tag (His) can be introduced to various positions in the protein by a gene manipulation (FIG. 5). Thus, when a self-assembled membrane is formed on a gold substrate and coupled with histidine by using a Ni complex that is selectively coupled with a self-assembled molecule, the protein can be fixed on the gold substrate with an arbitrary orientation and distance.

When an actual time of photoexcited electron transfer of such a sample is measured by using the probe apparatus according to the embodiment of the present invention, a direction and/or a structure of the protein molecule can be directly associated with an electronic connection state between the protein and a metal electrode to be revealed.

As described above, the probe apparatus according to this embodiment has a nanosecond or nano-scale resolution exceeding an application range of an existing probe apparatus, and can directly and experimentally solve a problem of a spatial arrangement in photoexcited electron transfer that is insoluble by an existing method. That is, according to the embodiment of the present invention, it is possible to directly observe, e.g., charge separation of an electron transfer protein or charge concentration of an antenna type molecular, e.g., giant porphyrin or planar dendrimer. A stereo effect of photoexcited electron transfer that is conventionally indirectly discussed can be directly examined in this manner.

Further, photoexcited electron transfer can be studied from a stereoscopic viewpoint, and an effect of a spatial arrangement of an individual molecule can be directly imaged. In the natural world, electron transport with an extraordinarily high efficiency is realized, but a stereoscopic arrangement that takes on an essential importance can be found in a large fluctuation of a macro-molecular system. When this result is compared with a theory to be determined as a design manual for a artificial system, it is possible to naturally learn, and hence it is very significant.

The present invention is not restricted to each foregoing embodiment, and various modifications can be carried out on an embodying stage without departing from the scope of the invention. For example, although the AFM is taken as the example of the probe apparatus in the foregoing embodiment, a technique of synchronizing interlocking of the probe with a transitional dynamic phenomenon can be applied to various kinds of general nano-probes as a method of realizing a time resolution. That is, synchronizing a vibration of the contiguous probe with occurrence/change of a physical amount allows the present invention to be applied to a wide range of scanning probe microscopes. Specifically, the present invention can be applied to, e.g., a time-resolved scanning near-field optical microscope (photochemistry/biochemistry), a time-resolved magnetic force microscope (an electromagnetic field response), or a time-resolved electrostatic force microscope (a transitional response of a nano-circuit). Furthermore, when the probe apparatus according to the embodiment of the present invention is combined with a pump probe method, it can be considered that measurement achieving both a single-molecule resolution and a time resolution that is approximately picoseconds is possible.

Moreover, the present invention can be likewise applied to a system in which an optical fiber is subjected to self-excited vibration in place of the cantilever to intermittently emit a laser beam. In this case, bending of the optical fiber is detected based on an optical lever or optical interferometry like the AFM to carry out rough control, and an optical phenomenon of a sample (e.g., light from the sample) caused due to light from the optical fiber (e.g., near-field light) may be measured by using an optical device such as a microscope.

Additionally, each foregoing embodiment includes inventions on various stages, and wide-ranging inventions can be extracted from appropriate combinations of a plurality of disclosed constituent requirements.

Further, for example, even if some constituent requirements are deleted from all constituent requirements disclosed in each foregoing embodiment, the problem explained in the section "Problem to be solved by the Invention" can be solved, and a structure in which such constituent requirements are deleted can be extracted as an invention when the effect explained in "Effect of the Invention" is obtained.

According to the present invention, a change in an electron state (electron transfer) of a molecule (or an atom) excited by light irradiation can be observed with a high time resolution and a high spatial resolution.

What is claimed is:

1. A probe device comprising:
a cantilever provided with a probe allocated to be opposed to a surface of a sample with a gap, a charge transfer force being applied between the probe and the sample surface;
a driver configured to maintain the gap;
a feedback circuit configured to feed back a signal value indicating motion of the cantilever, thereby self-exciting and vibrating the cantilever at a predominant resonance frequency having a vibrating period;
means for detecting the vibration period and applying an excitation light beam to the sample surface at an illumination timing based on the detected vibrating period, the application of the excitation light beam changing the charge transfer force to generate a frequency shift of the resonance frequency; and
means for measuring the frequency shift.

2. The probe device according to claim 1, further comprising:
means for generating an image signal relating to the charge transfer force from the frequency shift.

3. The probe device according to claim 1, further comprising:
a voltage source configured to apply a voltage to one of the cantilever and the sample.

4. The probe device according to claim 1, wherein the probe is moved to a position closest to the sample surface at the irradiation timing.

5. A method of measuring an electron state on a sample surface by utilizing a probe which is arranged so as to be opposed to the sample surface with a gap and supported on a cantilever, a charge transfer force being applied between the probe and the sample surface, the method comprising:
maintaining the gap;
emitting a first light beam onto the cantilever;
sensing the first light beam reflected from the cantilever to generate a sensor signal;
driving the vibrating unit in response to the sensor signal so as to cause the cantilever to be self-excited and vibrated at a resonance frequency which has a vibrating period and is fluctuated due to a change of the charge transfer force;
detecting the vibration period;
irradiating the sample surface with a second light beam at an irradiation timing which is determined based on the detected vibrating period, the irradiation of the second light beam changing the charge transfer force; and
measuring a displacement of the resonance frequency from the sensor signal.

6. The method according to claim 5, further comprising:
applying a voltage to one of the cantilever and the sample to change the charge transfer force.

7. The method according to claim 5, wherein the probe is moved to a position closest to the sample surface at the irradiation timing.

* * * * *